US012604814B2

(12) United States Patent
Krijn

(10) Patent No.: US 12,604,814 B2
(45) Date of Patent: Apr. 21, 2026

(54) REGULATION OF FRUIT SET IN PEPPERS BY DYNAMICALLY ADAPTING THE LED LIGHTING SPECTRUM

(71) Applicant: SIGNIFY HOLDING B.V., Eindhoven (NL)

(72) Inventor: Marcellinus Petrus Carolus Michael Krijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/863,770

(22) PCT Filed: May 8, 2023

(86) PCT No.: PCT/EP2023/062088
§ 371 (c)(1),
(2) Date: Nov. 7, 2024

(87) PCT Pub. No.: WO2023/217684
PCT Pub. Date: Nov. 16, 2023

(65) Prior Publication Data
US 2025/0301961 A1     Oct. 2, 2025

(30) Foreign Application Priority Data
May 10, 2022     (EP) .................................... 22172436

(51) Int. Cl.
*A01G 7/04*     (2006.01)
*H05B 45/20*     (2020.01)
(Continued)

(52) U.S. Cl.
CPC ............. *A01G 7/045* (2013.01); *H05B 45/20* (2020.01); *H05B 47/105* (2020.01);
(Continued)

(58) Field of Classification Search
CPC ........... A01G 7/045; A01G 7/00; A01G 9/249
See application file for complete search history.

(56) References Cited

U.S. PATENT DOCUMENTS 4,068,405 A     1/1978  Campbell et al.
9,854,749 B2    1/2018  Klase et al.
(Continued)

FOREIGN PATENT DOCUMENTS

EP          2727458 A1     5/2014
EP          2761997 A1     8/2014
WO      2021170783 A1     9/2021

OTHER PUBLICATIONS

Huber, Brandon M., et al., "Dynamic Far-Red Light Treatments to Maintain Plant Uniformity in High-Density Tomato Seedlings for Grafting," Aug. 11, 2020, URL: https://ashs.confex.com/ashs/2020/ meetingapp.cgi/paper/33231, Last Retrieved Oct. 8, 2021 (3 Pages).
(Continued)

*Primary Examiner* — Joshua D Huson
*Assistant Examiner* — Spencer T Callaway

(57) ABSTRACT

The disclosure provides a system for cultivating a pepper plant, wherein the system comprises a light generating device and a control system, wherein the light generating device is configured to provide device light to the pepper plant, wherein the device light comprises one or more of red light and far red light, wherein the red light comprises one or more wavelengths in the range of 600-700 nm, and wherein the far red light comprises one or more wavelengths in the range of 700-800 nm.

15 Claims, 2 Drawing Sheets

(51) Int. Cl.

| | |
|---|---|
| *H05B 47/105* | (2020.01) |
| *H05B 47/155* | (2020.01) |
| *H05B 47/16* | (2020.01) |
| *H05B 47/175* | (2020.01) |

(52) U.S. Cl.

CPC ........... *H05B 47/155* (2020.01); *H05B 47/16* (2020.01); *H05B 47/1965* (2024.01)

(56) References Cited

U.S. PATENT DOCUMENTS

| | | | |
|---|---|---|---|
| 2015/0223402 A1 | 8/2015 | Krijn et al. | |
| 2016/0000018 A1 | 1/2016 | Van Elmpt et al. | |
| 2016/0008802 A1 | 1/2016 | Schrock et al. | |
| 2016/0081145 A1 | 3/2016 | Peeters | |
| 2020/0045895 A1* | 2/2020 | Shahak Ravid | A01G 17/02 |
| 2020/0093072 A1* | 3/2020 | Pickett | A01G 7/045 |
| 2020/0167909 A1 | 5/2020 | Barrasso et al. | |
| 2020/0184153 A1* | 6/2020 | Bongartz | A01G 9/249 |
| 2020/0253129 A1 | 8/2020 | Nicole et al. | |
| 2020/0344965 A1 | 11/2020 | Song et al. | |
| 2021/0112727 A1 | 4/2021 | Nicole et al. | |
| 2021/0289711 A1 | 9/2021 | Matsumoto et al. | |
| 2022/0061227 A1* | 3/2022 | Naich | F21V 29/70 |

OTHER PUBLICATIONS

URL: https://www.horti-growlight.com/es-es/a-la-larga-todos-los-sistemas-de-iluminacion-en-el-cultivo-protegido-pasaran-a-ser-dinamicos, "Far Red Light Improves Production In the Long Run, All Lighting Systems in the Protected Crop Will Become Dynamic," Mar. 2021, Last Retrieved Oct. 8, 2021 (3 Pages).

Hopper, Brandon, "Far-Red Light Enhances Density of Tomato Seelings," Sep. 2, 2020, URL: https://cals.ncsu.edu/horticultural-science/news/far-red-light-enhances-density-of-tomato-seedlings, Last Retrieved Nov. 6, 2024 (5 Pages).

* cited by examiner

REGULATION OF FRUIT SET IN PEPPERS BY DYNAMICALLY ADAPTING THE LED LIGHTING SPECTRUM

CROSS-REFERENCE TO PRIOR APPLICATIONS

This application is the U.S. National Phase application under 35 U.S.C. § 371 of International Application No. PCT/EP2023/062088, filed on May 8, 2023, which claims the benefit of European Patent Application No. 22172436.2, filed on May 10, 2022. These applications are hereby incorporated by reference herein.

FIELD OF THE INVENTION

The invention relates to a system for cultivating a plant. Further, the invention relates to a horticulture system comprising such a system. Yet, the invention also relates to a method for cultivating a plant.

BACKGROUND OF THE INVENTION

Plant growth lighting devices and systems are known in the art. U.S. Pat. No. 9,854,749, for instance, describes a system for plant growth comprising a first LED device configured to emit light of a first color, wherein the first LED device is configured to emit light with a controlled beam half angle of less than or equal to 60°; and a second LED device configured to emit light of a second color, wherein the second LED device is configured to emit light in a with a controlled beam half angle of less than or equal to 60°; and wherein the system is configured to generate an emission spectrum having a first emission peak below 500 nm and a second emission peak above 600 nm. A first emission peak is at 425-475 nm, and a second emission peak is at 635-685 nm. Further, the system is configured to have a third emission peak at 500-600 nm. The photon flux of the emission spectrum contains between 5% and 10% green light.

US 2021/0112727 A1 discloses a method of controlling bolting using high level of far red. The disclosed method comprising providing during a controlling mode first horticulture light to the plant wherein at least 15% of the photons of the first horticulture light have a wavelength selected from the range of 700-800 nm, wherein at least 45% of the photons of the first horticulture light have a wavelength selected from the range of 640-700 nm, and wherein at maximum 10% of the photons of the first horticulture light have a wavelength selected from the range of 400-500 nm.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:

photoperiodism refers to the ability that plants have to sense and measure the periodicity of radiation (e.g. to induce flowering), phototropism refers to the growth movement of the plant towards and away from the radiation, and photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

In the context of horticulture lighting, near-UV is defined as one or more wavelengths selected from the spectral range of 300-400 nm, blue is defined as one or more wavelengths selected from the spectral range of 400-500 nm, white is defined is defined as wavelengths selected from the spectral range of 400-700 nm (which selected wavelengths together may constitute white light, such as a combination of wavelengths in the blue and green and red), green is defined as one or more wavelengths selected from the spectral range of 500-600 nm, red is defined as one or more wavelengths selected from the spectral range of 600-700 nm, deep-red is defined as one or more wavelengths selected from the spectral range of 640-700 nm, and far-red is defined as one or more wavelengths selected from the spectral range of 700-800 nm. Deep-red is thus a sub selection of red.

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. top-lighting or a combination of top-lighting and inter-lighting, especially for tomatoes, the red PPFD used may be typically 200 $\mu mol/sec/m^2$ and the ratio blue:red may be typically 1:7 (with red and blue especially selected from 625-675 nm and especially selected from 400-475 nm, respectively). Especially, the photosynthetic photon flux density may comprise about 10% blue and about 90% red. The PPFD can be determined from a photodiode, such as in combination with an optical filter, or such as by a spectrometer, or measured directly with a photomultiplier, optionally also in combination with an optical filter. The area in the PPFD refers to the local light receiving (plant) area of the space wherein the light source (s) are arranged. In case of a multi-layer system, it may be defined as the area of a relevant layer comprised in the multi-layer configuration; the PPFD may then be estimated in relation to each layer individually (see further also below). The area may be a value in an embodiment fed to the control unit manually, or may in an embodiment be evaluated (with e.g. sensors) by the control unit.

Plant growth may not only depend on the amount of light but may also depend on spectral composition, duration, and timing of the light on the plant. A combination of parameter values in terms of these aspects is called "light recipe" for growing the plant (herein, the words plant and crop can be interchanged).

LEDs can play a variety of roles in horticultural lighting such as:

1. Supplemental lighting: lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant farms.
4. Tissue culture.

For providing supplemental lighting during autumn, winter and spring in green-houses (or all-year round in multi-layer growth), in general high-power gas-discharge lamps are used that have to be mounted at a relative high location above the plants to ensure sufficiently uniform light distribution across the plants. At present, in greenhouses different types of high power lamps ranging from 600 up to 1000 W (e.g. high power HID) are used to provide plants with supplemental light. One drawback is that from the location above the plants the amount of light reaching the lower parts of the plant may be rather limited, dependent upon the type of crop. At the same time, the lower parts of the plant are often most in need of supplemental light. The same dilemma persists when using solid state lighting that is mounted above the plants. Nevertheless, LED lighting, especially solid state lighting, has some advantages over discharge based lighting.

In circumstances that plants get insufficient light from natural sunlight, e.g. in northern regions or in so-called "plant farming" or "vertical farming" that fully rely on artificial and well controlled conditions, there appears to be a need to provide light to the plant for growing (leaf and fruit), ripening and pre-harvest conditioning.

Light is not the only enabler for growth as also atmosphere (humidity level, $CO_2/O_2$ levels, etc.), water, nutrients and spore elements are of main importance. Temperature (and temperature profile/cycles over day/night) is also a key contributor to the success of growing plants. In the field of horticulture in controlled environments, such as greenhouses and plant farms, it seems that there is a need for soilless or hydroponic horticulture, typically used for now in high profit/high value cultivation. Such methods are also based on non-natural growing of plants and could require or profit from artificial optimizations.

The space available for food production is becoming scarcer. Innovation in production methods is needed to deliver higher yields from smaller footprints, while becoming more sustainable (minimum use of energy and water). Producing food in closed environments such as plant farms is a method to meet these demands. In plant farms (also known as plant factories, vertical farms or city farms), food is grown in multiple layers, making much better use of the available space as compared to outdoor growth or growth in greenhouses. This implies that daylight will not be able to reach all plants and nearly all the light has to come from artificial lighting. In plant farms, there is a need for providing to the plants a light treatment that is optimal at all times. At the same time, it is imperative that the light that is generated by the LED modules is used as efficiently as possible in order to reduce energy consumption and result in a profitable business. In plant farms, the production per unit of area is much higher than the production in the open field. The use of water is minimized. Plant diseases and pests can be prevented more easily.

In horticulture, relatively much light, and thus energy, is used. Producing more yield while using less photons is the key for the future of horticulture.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially any species selected from medicinal plants, vegetables, herbs, sprouts, mushrooms, plants bearing nuts, plants bearing seeds, plants bearing flowers, plants bearing fruits, non-food crops such as grass and ornamental trees, etc. Herein, the term "plant" is used for essentially all stages. The term "plant part" may refer to root, stem, leaf, fruit (if any), etc. Even more especially, the term "plant" is used to refer essentially to any species selected from medicinal plants, vegetables, herbs, sprouts, plants bearing nuts, plants bearing seeds, plants bearing flowers, plants bearing fruits, non-food crops.

The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crops and non-crop plants.

Especially, the present invention is directed to pepper plants, especially sweet pepper plants, which may include their bolts, flowers, fruits, leaves, and stems.

Sweet pepper is an important greenhouse crop. The crop can benefit from supplemental lighting for year-round production. It appears that a major issue in growing sweet peppers is the flushing pattern in the weekly number of new set fruits, making it very difficult to get a constant yield. It results in large periodic fluctuations in the weekly yield (i.e., the number of harvestable fruits), with a period of typically 4-5 weeks. The origin of this flushing pattern is as follows: (a) new flowers are produced typically at a constant rate (largely determined by greenhouse temperature); (b) soon the flowers become small fruits (called set fruits); this takes about a week; (c) gradually the plant load increases (plant load is the number of fruits hanging on a plant); (d) assimilates created by photosynthesis are partitioned to the fruits, making them grow. After 6-7 weeks, they are ready to be harvested; (e) the high plant load results in less assimilates being available for the flowers and newly set fruits. As a result, a considerable fraction of the flowers and newly set fruits will abort; (f) gradually, the plant load decreases; (g) because of the reduced plant load, more assimilates become available for the flowers and newly set fruits, resulting in less abortion; (h) gradually, the plant load will increase again; (i) etc. Hence, a major issue in growing sweet peppers is the flushing pattern in the weekly number of new set fruits. Periods with good fruit set are alternated with periods with poor fruit set (caused by abortion of flowers and newly set fruits). This flushing pattern may result in a similar pattern in the yield, albeit shifted in time. The fluctuations in yield can be quite large. By means of strategically pruning flowers and newly set fruits, growers try to reduce the amplitude of the fluctuating yield pattern. This is, however, cumbersome in practice.

Hence, it is an aspect of the invention to provide an alternative system, which preferably further at least partly obviates one or more of above described drawbacks. The present invention may have as object to overcome or ameliorate at least one of the disadvantages of the prior art, or to provide a useful alternative.

According to a first aspect, the invention provides a system for cultivating a pepper plant, especially a sweet pepper plant. The system may comprise a light generating device and a control system. In embodiments, the light generating device may be configured to provide (supplemental) device light to the pepper plant. Especially, the (supplemental) device light may comprise one or more of red light and far red light. The red light (R) may comprise one or more wavelengths in the range of 600-700 nm. The far red light (FR) may comprise one or more wavelengths in the range of 700-800 nm. Especially, the systems in embodiments have an operational mode including a sensing stage, a planning stage, and an execution stage.

In embodiments, the system may comprise a sensor system. In further embodiments, the sensor system may be configured (in a sensing stage) to determine a plant load-related parameter of the pepper plant and to provide an input signal to the control system. Especially, the plant load-related parameter may be selected from the group comprising a plant load, a flowering rate, a flower abortion rate, a (net) fruit set rate, and a fruit abortion rate. Further, in embodiments the control system may be configured (in a planning stage) to determine a target R:FR ratio (range) of red light to far red light (in μmol/m²/day), especially based on the input signal and a plant load threshold. Yet, in embodiments the control system may be configured (in an execution stage) to expose the pepper plant to the target R:FR ratio by controlling the light generating device. In particular, in embodiments, the plant load threshold, especially the lower plant load threshold, or especially the higher plant load threshold, may be determined by a target yield in terms of kgs of fruit (and/or number of fruit) and/or timing for the pepper plant. Hence, the plant load threshold(s) may be selected in view of a target yield, wherein the target yield comprises one or more of a (desired) fruit number, a (desired) fruit mass, and a (desired) fruit ripening time. In embodiments, the target yield may comprise both a (desired) fruit number and a (desired) fruit mass, or a related value, like a (desired) fruit mass per fruit.

Generally, in embodiments, the higher plant load threshold may be above the lower plant load threshold, but, in embodiments, the higher plant load threshold and the lower plant load threshold may also be the same.

In embodiments, the target yield may relate to a (single) pepper plant. In further embodiments, the target yield may relate to a plurality of pepper plants. In further embodiments, the target yield may relate to a group of plants, such as a group of plants in a (same) greenhouse part (see below).

Hence, especially the invention provides in embodiments a system for cultivating a pepper plant, wherein the system comprises a light generating device, and a control system, wherein the light generating device is configured to provide device light to the pepper plant, wherein the device light comprises one or more of red light and far red light, wherein the red light comprises one or more wavelengths in the range of 600-700 nm, and wherein the far red light comprises one or more wavelengths in the range of 700-800 nm wherein the system has an operational mode wherein: the control system (300) is configured to acquire an input signal, wherein the input signal relates to a plant load-related parameter of the pepper plant, wherein the plant load-related parameter is selected from the group comprising a plant load, a flowering rate, a flower abortion rate, a fruit set rate, and a fruit abortion rate; the control system is configured to determine a plant load based on the input signal, and wherein one or more of the following applies: (i) the control system is configured to compare the plant load to a lower plant load threshold, and to select a target R:FR ratio of red light to far red light above a threshold ratio T if the plant load is lower than the lower plant load threshold; and (ii) the control system is configured to compare the plant load to a higher plant load threshold, and to select a target R:FR ratio above a threshold ratio T if the plant load is higher than the higher plant load threshold, especially wherein the threshold ratio T is selected from the range of 10-25; the control system is configured to expose the pepper plant to the target R:FR ratio by controlling the light generating device.

With such a system the plant load may be more constant in time and, as a result, the yield may be more constant in time. For instance, the number and/or total weight of the fruits may be more constant over time. Further, with such a system the quality of the fruits may also be more constant over time. Further, with such a system cultivation of the plant may be easier as the cultivation parameters may also be more constant. Hence, supplemental lighting may promote a more constant plant load and a more constant fruit quality and may thus further simplify the cultivation of the pepper.

As indicated above, the invention provides a system for cultivating a pepper plant. Especially, the pepper plant may be selected from the genus *Capsicum*. More especially, the pepper plant may be selected from the group of *C. annuum, C. baccatum, C. chinense, C. frutescens*, and *C. pubescens*. Especially, the pepper plant may be of the species *Capsicum annuum*. Note that the pepper plant is not part of the system, but the system may assist in cultivating the pepper plant.

The term "plant" may also refer to a seed, or to a seedling. The term "plant" may thus in general refer to any of the stages from seed to (mature) plant. The term "plant" may also refer to a plurality of (different) plants.

Especially, the system may comprise a light generating device and a control system. In embodiments, the system may further comprise a sensor system. In further embodiments, the system, especially the control system, may further comprise a user interface.

The light generating device may be configured to provide (supplemental) device light to the pepper plant. Hence, the system may be applied for conditions wherein the pepper plant only receives artificial light. In such embodiments, the red and/or far red light may exclusively be provided by the light generating device of the system. In alternative embodiments, the system is an add-on system to an existing system and may be configured to provide supplemental light to the artificial light of the existing system. The system may also be applied for conditions wherein the pepper plant receives during at least part of the day and during at least part of the year artificial light. During relatively dark periods, like the night, dusk, dawn, a cloudy day, a part of the year wherein anyhow less light may be received (like the winter), the system may provide supplemental light. This light may be supplemental to the daylight it receives, either at the same time the pepper plant receives the daylight and/or at times that there is essentially no daylight (like, e.g., during the night, or during dusk, dawn, a cloudy day, etc.).

A light generating device may especially be configured to generate device light. Especially, the light generating device may comprise a light source. The light source may especially be configured to generate light source light. In embodiments, the device light may essentially consist of the device light. In other embodiments, the device light may essentially consist of converted light source light. In yet other embodiments, the device light may comprise (unconverted) light source light and converted light source light. Light source light may be converted with a luminescent material into luminescent material light and/or with an upconverter into upconverted light. The term "light generating device" may also refer to a plurality of light generating devices which may provide device light having essentially the same spectral power distributions. In specific embodiments, the term "light generating device" may also refer to a plurality of light generating devices which may provide device light having different spectral power distributions.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light sources may be configured on the same substrate. In embodiments, a COB is a multi LED chip configured together as a single lighting module.

The light source may have a light escape surface. Referring to conventional light sources such as light bulbs or fluorescent lamps, it may be the outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LED), a resonant cavity light emitting diode (RCLED), a vertical cavity laser diode (VCSELs), an edge emitting laser, etc. . . . The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises an LED (light emitting diode). The terms "light source" or "solid state light source" may also refer to a superluminescent diode (SLED). The term LED may also refer to a plurality of LEDs. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source like a blue LED, or a green light source such as a green LED, and a red light source such as a red LED. Such LEDs, which may not comprise a luminescent material ("phosphor") may be indicated as direct color LEDs. In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material for conversion into other light. In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation. In embodiments, the term "light source" may also refer to a combination of a light source, like a LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

Especially, the spectral power distribution of the device light may be controllable. Hence, a control system (see also below) may be applied to control the spectral power distribution. In specific embodiments, the system comprises at least two types of light generating devices. A first type of light generating devices may be configured to provide device light comprising more red light than far red light, such as essentially no far red light. A second type of light generating devices may be configured to provide device light comprising more far red light than red light, such as essentially no red light. Especially, the control system may be configured to individually control the first type of light generating device and the second type of light generating devices. The term "type of light generating devices", and similar terms, may refer to one or more light generating devices of such types. In specific embodiments, the light generating device(s) comprise solid state light sources, especially LEDs.

Hence, the (supplemental) device light may comprise one or more of red light and far red light. Especially, the red light may comprise one or more wavelengths in the range of 600-700 nm. Further, especially the far red light may comprise one or more wavelengths the range of 700-800 nm. The red light may have a spectral power distribution in the 600-800 nm wavelength range of which at least 70% of the spectral power is within the 600-700 nm range, more especially at least 80%, such as at least 90%. Alternatively, or additionally, the far red light may comprise one or more wavelengths the range of 700-800 nm. The far red light may have a spectral power distribution in the 600-800 nm wavelength range of which at least 70% of the spectral power is within the 700-800 nm range, more especially at least 80%, such as at least 90%.

The phrase "the red light may comprise one or more wavelengths in the range of 600-700 nm", and similar phrases, indicates that the red light may consist of one or more of (i) one or more narrow emission bands, and (ii) one or more broad bands. Hence, in one extreme the red light may be provided by a laser providing essentially monochromatic light in the red wavelength range, and in another extreme, essentially at all wavelengths there may be intensity, due to the use of one or more broad emissions bands and/or a plurality of narrow emission bands. Likewise, the phrase "the far red light may comprise one or more wavelengths in the range of 700-800 nm", and similar phrases, indicates that the far red light may consist of one or more of (i) one or more narrow emission bands, and (ii) one or more broad bands. Hence, in one extreme the far red light may be provided by a laser providing essentially monochromatic light in the far red wavelength range, and in another extreme, essentially at all wavelengths there may be intensity, due to the use of one or more broad emissions bands and/or a plurality of narrow emission bands.

The system has an operational mode, which may especially include (a) acquiring (or determining) a plant load-related parameter of the pepper plant and to provide an input signal to the control system, (b) determining a target R:FR ratio (range) of red light to far red light based on the input signal and a plant load threshold, and (c) exposing the pepper plant to the target R:FR ratio by controlling the light generating device. Hence, the system may have an operational mode, which may especially include a sensing stage (or "acquisition stage"), a planning stage, and an execution stage, wherein: (a) (in a sensing stage) the control system may (be configured to) acquire an input signal, wherein the input signal relates to (or comprises) a plant load-related parameter of the pepper plant, especially wherein a sensor system may be configured to determine a plant load-related parameter of the pepper plant and to provide an input signal to the control system, or especially wherein a user interface is configured to receive user input and to provide the input signal to the control system, (b) (in a planning stage) the control system may be configured to determine a target R:FR ratio (range) of red light to far red light (in $\mu mol/m^2/day$) based on the input signal and a plant load threshold, and (c) (in an execution stage) the control system may be configured to expose the pepper plant to the target R:FR ratio by controlling the light generating device.

In particular, in further embodiments, the target R:FR ratio (range) may especially be selected to be above a threshold ratio T if the plant load is lower than a lower plant load threshold and may especially be selected to be below a threshold ratio T if the plant load is higher than a higher plant load threshold. In embodiments, the threshold ratio T may be selected from the range of 1-50, such as from the range of 5-40, especially from the range of 10-25, such as from the range of 12-18, especially from the range of 13-17. In further embodiments, the target R:FR ratio (range) may especially be selected to be >1*T, especially ≥1.05*T, such as ≥1.1*T, especially ≥1.2*T if the plant load is lower than a lower plant load threshold. In further embodiments, the target R:FR ratio (range) may especially be selected to be <T, especially ≤0.95*T, such as ≤0.9*T, especially ≤0.8*T, if the plant load is higher than a higher plant load threshold.

In principle, any target R:FR ratio may be selected as device light provided without red or far red light. Hence, in embodiments, the target R:FR ratio may be selected from the range of 0-∞, such as from the range of 0.1-100, especially from the range of 0.5-60, such as from the range of 5-30. Hence, in embodiments, the target R:FR ratio may be selected to be (essentially) 0 or (essentially) ∞, i.e., in embodiments device light may be provided that is (essentially) devoid of red light (and essentially only consists far red light) or far red light ((and essentially only consists red light), respectively.

Hence, during cultivation of the plant over time, the R:FR ratio may also vary over time and may show a substantially periodical fluctuation (such as periods of about 4-5 weeks).

In further embodiments, the threshold ratio T may be (about) 14, or (about) 15, or (about) 16.

Especially, the plant load-related parameter may be selected from the group comprising a plant load, a flowering rate, a flower abortion rate, a (net) fruit set rate, and a fruit abortion rate. Especially, the plant load may be defined as the number of fruits on a plant. Further, especially the flowering rate may be defined as the number of new flowers per plant and per week. Further, especially the flower abortion rate may be defined as the number of flowers per plant and per week that will abort. Further, especially the fruit set rate may be defined as the number of newly set fruits per plant and per week. Yet further, especially the fruit abortion rate may be defined as the number of fruits per plant and per week that will abort. Further, especially the net fruit set rate may be defined as the number of new set fruits per week per plant that remain on the plant until harvest. Further, the yield may be defined as the number of harvestable fruits per plant per week. In embodiments, two or more plant load-related parameters may be chosen. This may increase the reliability of the system and/or method.

In embodiments, the control system may be configured to determine a time derivative of the plant load based on the input signal. In such embodiments, especially one or more of the following may apply: (i) the control system may (be configured to) compare the time derivative of the plant load to a plant load time derivative threshold, and (to) select a target R:FR ratio<threshold ratio T if the time derivative of the plant load is higher than the plant load time derivative threshold; and (ii) the control system may (be configured to) compare the time derivative of the plant load to a plant load time derivative threshold, and (to) select a target R:FR ratio>threshold ratio T if the time derivative of the plant load is lower than the plant load time derivative threshold. Especially, in embodiments, threshold ratio T may be selected from the range of 10-25, such as from the range of 13-17. In particular, by determining the R:FR ratio or the target phytochrome stationary state (see below) based on a derivative, the control system may more conveniently act in an anticyclical manner.

The invention also provides in an aspect a system for cultivating a pepper plant, wherein the system comprises a light generating device and a control system, wherein the light generating device is configured to provide device light to the pepper plant, wherein the device light comprises one or more of red light and far red light, wherein the red light comprises one or more wavelengths in the range of 600-700 nm, and wherein the far red light comprises one or more wavelengths in the range of 700-800 nm; wherein the system has an operational mode wherein: (a) the control system is configured to acquire (or determine) an input signal, wherein the input signal relates to a plant load-related parameter of the pepper plant, wherein the plant load-related parameter is selected from the group comprising a plant load, a flowering rate, a flower abortion rate, a fruit set rate, and a fruit abortion rate; (b) the control system is configured to determine a target phytochrome stationary state based on the input signal and a plant load threshold, especially wherein one or more of the following applies: (i) the control system is configured to compare the plant load to a lower plant load threshold, and to select a target phytochrome stationary state from the range of >0.87, such as ≥0.88 if the plant load is lower than the lower plant load threshold; and (ii) the control system is configured to compare the plant load to a higher plant load threshold, and to select the target phytochrome stationary state from the range of <0.87, such as ≤0.86 if the plant load is higher than the higher plant load threshold; and (c) (in an execution stage) the control system may be configured to subject the pepper plant to the target phytochrome stationary state by controlling the light generating device. Yet, the invention also provides in an aspect a system for cultivating a pepper plant, wherein the system comprises a light generating device, a sensor system, and a control system, wherein the light generating device is configured to provide (supplemental) device light to the pepper plant, wherein the (supplemental) device light comprises one or more of red light and far red light, wherein the red light comprises one or more wavelengths in the range of 600-700 nm, and wherein the far red light comprises one or more wavelengths the range of 700-800 nm wherein the system has an operational mode wherein: (a) (in a sensing stage) the sensor system is configured to acquire (or determine) a plant load-related parameter of the pepper plant and to provide an input signal to the control system, wherein the plant load-related parameter is selected from the group comprising a plant load, a flowering rate, a flower abortion rate, a (net) fruit set rate, and a fruit abortion rate; (b) (in a planning stage) the control system may be configured to determine a target phytochrome stationary state based on the input signal and a plant load threshold, especially wherein one or more of the following applies: (i) the control system is configured to compare the plant load to a lower plant load threshold, and to select a target phytochrome stationary state from the range of >0.87, such as ≥0.88 if the plant load is lower than the lower plant load threshold; and (ii) the control system is configured to compare the plant load to a higher plant load threshold, and to select the target phytochrome stationary state from the range of <0.87, such as ≤0.86 if the plant load is higher than the higher plant load threshold; and (c) (in an execution stage) the control system may be configured to subject the pepper plant to the target phytochrome stationary state by controlling the light generating device.

The formula for the phytochrome stationary state is as follows:

$$PSS = \frac{\sum_{300}^{800} N(\lambda)\sigma_r(\lambda)}{\left( \sum_{300}^{800} N(\lambda)\sigma_r(\lambda) + \sum_{300}^{800} N(\lambda)\sigma_{fr}(\lambda) \right)}$$

Here, $N(\lambda)$ is the photon flux density (in $\mu mol/m^2/s$), which depends on the wavelength ($\lambda$). Further, $\sigma_r$ and $\sigma_{fr}$ are the phytochrome photochemical cross-sections of the $P_r$ and $P_{fr}$ phytochromes, respectively, measured in square meters per mole. These are also wavelength dependent. The dependence of $\sigma_r$ and $\sigma_{fr}$ on wavelength is given by Sager et al: J. C. Sager, W. O. Smith, J. L. Edwards, K. L. Cyr (1988), Photosynthetic efficiency and phytochrome photoequilibria determination using spectral data, Transactions of the ASAE, 31(6), 1882-1889.

In embodiments, (in the planning stage) the control system may be configured to determine a plant load based on the input signal. Further, one or more of the following may apply: (i) the control system may be configured to compare the plant load to a lower plant load threshold, and to select a target R:FR ratio >threshold ratio T if the plant load is lower than the lower plant load threshold, and (ii) the control system may be configured to compare the plant load to a higher plant load threshold, and to select a target R:FR ratio <threshold ratio T if the plant load is higher than the higher plant load threshold, especially wherein T is selected from the range of 10-25, such as from the range of 10-20. Especially, in embodiments one or more applies of: (a) the control system may be configured to select a target R:FR ratio >20 if the plant load is lower than the lower plant load threshold, and (b) the control system may be configured to select a target R:FR ratio <10 if the plant load is higher than the higher plant load threshold.

In embodiments, the plant load may be a forecasted plant load and in other embodiments the plant load may be a current plant load. Hence, controlling may e.g. be based on a feedback principle and/or a feedforward principle.

In embodiments, the system may comprise a sensor system. The sensor system may especially be configured to determine the plant-load-related parameters of the pepper plant and to provide an input signal, especially a related sensor input signal, to the control system.

The sensor system may comprise a stationary sensor, e.g. arranged in a horticulture system like a greenhouse or a plant factory (or climate cell), such as over the plants or between the plants. Alternatively, or additionally, the sensor system may comprise a moveable sensor device configured to determine the plant load-related parameter. The movable sensor device may comprise a drone, a driving robot, a sensor movable along a rail, a sensor having one or two freedoms to move, such as a rotatable sensor, etc.

Especially, the sensor system may comprise a camera. The sensor system may be based on a camera in combination with computer vision software, e.g. to detect and count one or more of flowers, fruits, and optionally other plant parameters like one or more of number of leaves, leave size, leave color, etc. In this manner, for each plant, or a selection of plants, e.g. the number of fruits on that plant can be determined (the plant load).

As described above, the system may, in embodiments, comprise a sensor system. In such embodiments, in the operational mode, especially in the sensing stage, the sensor system may (be configured to) determine the plant load-related parameter of the pepper plant and to provide a related sensor input signal to the control system. Hence, the input signal may comprise a related sensor input signal. In further embodiments, the control system may (be configured to) determine the plant load based on the related sensor input signal.

In embodiments, especially the plant load may be provided as (user) input. In particular, in embodiments, the system, especially the control system, may comprise a user interface. In such embodiments, in the operational mode, especially in the sensing stage, the user interface may be configured to receive user input on the plant load-related parameter of the pepper plant and to provide a related user input signal (to the control system). Hence, the input signal may comprise a user input signal. In further embodiments, in the operational mode, especially in the planning stage, the control system may (be configured to) determine the plant load based on the related user input signal.

In specific embodiments, the grower may directly provide a plant load number. Such number can be obtained by regularly counting the number of fruits on a selection of plants in the greenhouse and averaging the result. This information, or information derived therefrom, may be provided to the system via a user interface.

Alternatively, the grower numbers each new flower (the first flower on the plant gets number 1, the second gets number 2, etc., e.g. making use of stickers or other labels) or each new fruit. Each week, the grower notes the number of the last new pepper that appeared on the plant and notes the number of the last harvested pepper. From this bookkeeping, it is then relatively easy to determine the plant load. Typically, the numbers are entered manually in an app on a tablet computer, after which the data are sent to a data platform and converted by an algorithm into plant load data.

As indicated above, the device light may in embodiments be provided daily. Further, in embodiments the device light may be provided only during part of the days. Yet, in embodiments the device light may be provided only during specific periods of the year. In specific embodiments, the control system may be configured to control the light generating device to subject the pepper plant to a (total) light exposure of at least 5 mol/m$^2$/day. Hence, when the light dose due to receipt of daylight is lower than the indicated minimum value, the device may provide supplemental device light to obtain the desired (daily) exposure. However, when the light dose due to the receipt of daylight is equal to or higher than the indicated minimum value, the device may still provide supplemental device light according to the principles defined herein. However, in the latter situation the effect of the R:FR ratio in the (supplemental) device light may be less pronounced.

In yet a further aspect, the invention also provides a horticulture system comprising the system as defined herein. Especially, in embodiments, the horticulture system may comprise a horticulture space for hosting a pepper plant, and the system may be configured to provide the device light to the horticulture space.

The horticulture space may especially be provided by a horticulture arrangement. Especially, the term "horticulture arrangement" refers to a plant factory or climate cell, wherein the plants are grown under controlled conditions, and wherein the plants substantially do not receive day light. Further, such plant factory may be climatized, such as in the case of a climate cell. Hence, in embodiments the horticulture arrangement includes such plant factory or climate cell. Herein, the term plant factory is considered to encompass the embodiment of a climate cell.

However, the invention is not limited to horticulture arrangements wherein the plants essentially only receive artificial light. Hence, the horticulture space may also be provided by a greenhouse (or glass house) or other arrangement which allows entry of daylight into the arrangement. Hence, the horticulture arrangement may also be an arrangement with walls and/or roof made chiefly of transparent material, such as glass, which is configured to cultivate plants, such as pepper plants. Therefore, in specific embodiments the horticulture space may be configured to receive natural daylight, and the device light may comprise supplemental device light.

Hence, in embodiments the horticulture system may comprise one or more of a greenhouse and a vertical farm.

As also indicated above, in embodiments the system may be configured to provide the supplemental device light during a low natural lighting period, especially during a low natural lighting period in the second half of the day, such as in the last 8 hours of the day, especially in the (late) afternoon or in the evening. During the low natural lighting period the photon flux density of natural daylight may be ≤500 μmol/m$^2$/s in the 400-700 nm region. In particular, as described above, the R:FR ratio of the device light may affect the state of plant phytochromes, which may naturally switch between different states as a factor of the light they are exposed to. Hence, by setting a phytochrome state through the exposure to (supplemental) device light in the later part of the day, the phytochrome state may remain stable for a (relatively) longer period of time as the exposure to light that would reset (or reverse) the phytochrome state may be (relatively) low during the night.

In yet a further aspect, the invention also provides a method for cultivating a pepper plant. In embodiments, the method may comprise a sensing stage, a planning stage, and an execution stage. In embodiments, the method may comprise (i) acquiring an input signal, wherein the input signal relates to a plant load-related parameter of the pepper plant, especially by determining the plant load-related parameter of the pepper plant and providing the input signal, (ii) determining a target R:FR ratio (range) of red light to far red light (in $\mu mol/m^2/day$) based on the input signal and a plant load threshold, especially determining a plant load based on the input signal, and one or more of: (a) comparing the plant load to a lower plant load threshold, and selecting a target R:FR ratio of red light to far red light above a threshold ratio T if the plant load is lower than the lower plant load threshold; and (b) comparing the plant load to a higher plant load threshold, and selecting a target R:FR ratio below a threshold ratio T if the plant load is higher than the higher plant load threshold, especially wherein the threshold ratio T is selected from the range of 10-25, such as from the range of 13-17, and (iii) exposing the pepper plant to the target R:FR ratio by providing device light. Especially, the plant load-related parameter may be selected from the group comprising a plant load, a flowering rate, a flower abortion rate, a (net) fruit set rate, and a fruit abortion rate. Further, the red light may comprise one or more wavelengths in the range of 600-700 nm, and the far red light may comprise one or more wavelengths in the range of 700-800 nm. Especially, the invention provides in embodiments a method for cultivating a pepper plant, comprising: (a sensing stage comprising) determining a plant load-related parameter of the pepper plant and to provide an input signal, wherein the plant load-related parameter may be selected from the group comprising a plant load, a flowering rate, a flower abortion rate, a (net) fruit set rate, and a fruit abortion rate; (a planning stage comprising) determining a target R:FR ratio (range) of red light to far red light (in $\mu mol/m^2/day$) based on the input signal and a plant load threshold, wherein the red light may comprise one or more wavelengths in the range of 600-700 nm, and wherein the far red light may comprise one or more wavelengths in the range of 700-800 nm; and (an execution stage comprising) exposing the pepper plant to the target R:FR ratio by providing device light.

Especially, the invention provides in yet a further aspect a method for cultivating a pepper plant, comprising: (a sensing stage comprising) determining a plant load-related parameter of the pepper plant and to provide an input signal, wherein the plant load-related parameter may be selected from the group comprising a plant load, a flowering rate, a flower abortion rate, a (net) fruit set rate, and a fruit abortion rate; (a planning stage comprising) determining a target phytochrome stationary state based on the input signal and a plant load threshold; and (an execution stage comprising) subjecting the pepper plant to the target phytochrome stationary state by providing device light.

Embodiments described in relation to the system may also apply to the method. A few specific embodiments, however, are elucidated in a bit more detail also in relation to the method.

As can be derived from the above, in embodiments, the method, especially the planning stage, may comprise determining a plant load based on the input signal, and one or more of: (i) comparing the plant load to a lower plant load threshold, and selecting a target R:FR ratio (from the range of) >threshold ratio T if the plant load is lower than the lower plant load threshold, and (ii) comparing the plant load to a higher plant load threshold, and selecting a target R:FR ratio (from the range of) <threshold ratio T if the plant load is higher than the higher plant load threshold. Especially, in embodiments the method may comprise one or more of: (a) selecting a target R:FR ratio (from the range of) >15, such as ≥20, if the plant load is lower than the lower plant load threshold, and (b) selecting a target R:FR ratio (from the range of) <15, such as ≤10, if the plant load is higher than the higher plant load threshold. In embodiments, the plant load may be a forecasted plant load, or the plant load may be a current plant load. Further, as indicated above, the method may in embodiments (further) comprise exposing the pepper plant to (at least part of) natural daylight. Yet, in embodiments the method may comprise providing the (supplemental) device light during a low natural lighting period, especially during a low natural lighting period in the second half of the day, such as in the last 8 hours of the day, especially in the (late) afternoon or in the evening, for instance, during the low natural lighting period the photon flux density of natural daylight may be ≤500 $\mu mol/m^2/s$ in the 400-700 nm region. Especially, the target R:FR ratio may be a daily target R:FR ratio, especially for the (supplemental) device light, or especially for total light (including both natural and device light). Further, in embodiments the method may comprise using the system as defined herein or using the horticulture system as defined herein.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. The light generating device may comprise a housing or a carrier, configured to house or support, one or more elements of the light generating system. For instance, in embodiments the light generating device may comprise a housing or a carrier, configured to house or support the light generating device(s).

Herein, the term "visible light" especially relates to light having a wavelength selected from the range of 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
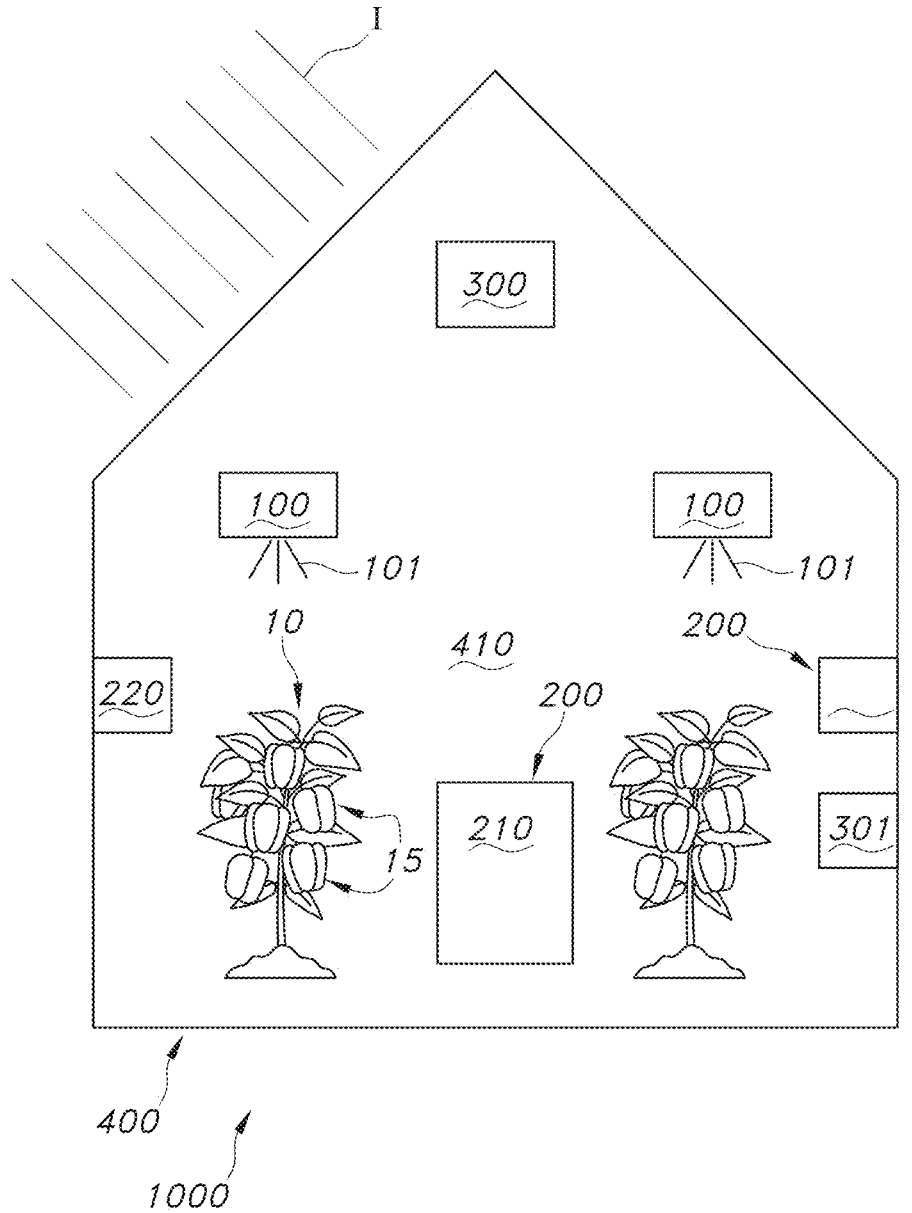
FIG. 1 schematically depicts an embodiment of the system and of the horticulture system.

FIG. 1 schematically depicts an embodiment of a system 1000 for cultivating a pepper plant 10. Note that pepper plant 10 is not part of the system 1000. The system 1000 may be used for cultivating pepper plant 10. Pepper plant 10 may be selected from the genus *Capsicum*, especially the pepper plant 10 may be of the species *Capsicum annuum*. Reference 15 refers to a bell pepper (fruit). System 1000 may comprise a light generating device 100 and a control system 300. The light generating device 100 may be configured to provide (supplemental) device light 101 to the pepper plant 10. The light generating device 100 may especially be a solid state based light generating device, such as a light generating device 100 comprising one or more LEDs. The (supplemental) device light 101 may comprise one or more of red light and far red light. The red light may comprise one or more wavelengths in the range of 600-700 nm, and the far red light may comprise one or more wavelengths the range of 700-800 nm. The system 1000 has an operational mode comprising: (a) (in a sensing stage) acquiring an input signal, wherein the input signal relates to (or comprises) a plant load-related parameter of the pepper plant 10; (b) (in a planning stage) the control system 300 may be configured to determine a target R:FR ratio (range) of red light to far red light (in $\mu$mol/m$^2$/day) based on the input signal and a plant load threshold, especially wherein the control system 300 is configured to determine a plant load based on the input signal, and wherein one or more of the following applies: (i) the control system 300 is configured to compare the plant load to a lower plant load threshold, and to select a target R:FR ratio of red light to far red light from the range of >threshold ratio T if the plant load is lower than the lower plant load threshold; and (ii) the control system 300 is configured to compare the plant load to a higher plant load threshold, and to select the target R:FR ratio from the range of <threshold ratio T if the plant load is higher than the higher plant load threshold, especially wherein the threshold ratio T is selected from the range of 10-25, such as from the range of 13-17; and (c) (in an execution stage) the control system 300 may be configured to expose the pepper plant 10 to the target R:FR ratio by controlling the light generating device 100. The plant load-related parameter may be selected from the group comprising a plant load, a flowering rate, a flower abortion rate, a (net) fruit set rate, and a fruit abortion rate.

Especially, in embodiments, the system 1000 may comprise a sensor system 200. In such embodiments, in the operational mode, especially in the sensing stage, the sensor system 200 may be configured to determine a plant load-related parameter of the pepper plant 10 and to provide an input signal to the control system 300. In particular, in such embodiments, in the operational mode (a) (in a sensing stage) the sensor system 200 may be configured to determine the plant load-related parameter of the pepper plant 10 and to provide a related sensor input signal to the control system 300; and (b) (in a planning stage) the control system 300 may be configured to determine the plant load based on the related sensor input signal.

In further embodiments, the system 1000, especially the control system 301, may comprise a user interface. In such embodiments, in the operational mode: (a) (in the sensing stage) the user interface 301 is configured to receive user input on the plant load-related parameter of the pepper plant 10 and to provide a related user input signal to the control system 300; and (b) (in the planning stage) the control system 300 is configured to determine the plant load based on the related user input signal.

System 1000 may comprise one or more of sensor system 200 and user interface 301.

Alternatively, (in a planning stage) the control system 300 may be configured to determine a target phytochrome stationary state based on the input signal and a plant load threshold, and (in an execution stage) the control system 300 may be configured to subject the pepper plant 10 to the target phytochrome stationary state by controlling the light generating device 100.

In embodiments, (in the planning stage) the control system 300 may be configured to determine a plant load based on the input signal. Especially, one or more of the following applies: (i) the control system 300 may be configured to compare the plant load to a lower plant load threshold, and to select a target R:FR ratio >threshold ratio T if the plant load may be lower than the lower plant load threshold, and (ii) the control system 300 may be configured to compare the plant load to a higher plant load threshold, and to select a target R:FR ratio <threshold ratio T if the plant load may be higher than the higher plant load threshold. Especially, one or more applies of: (a) the control system 300 may be configured to select a target R:FR ratio >15, such as ≥20, if the plant load may be lower than the lower plant load threshold, and (b) the control system 300 may be configured to select a target R:FR ratio <15, such as ≤10, if the plant load may be higher than the higher plant load threshold. Further, the plant load may be a forecasted plant load, or the plant load may be a current plant load.

In embodiments, the sensor system 200 may comprise a moveable sensor device 210 configured to determine the plant load-related parameter.

The control system 300 may especially be configured to control the light generating device 100 to subject the pepper plant 10 to a (total) light exposure of at least 6 mol/m$^2$/d, such as at least 10 mol/m$^2$/d, especially at least 14 mol/m$^2$/d.

In embodiments, the target R:FR ratio (range) may be a (total) daily target R:FR ratio (range), including both natural daylight 1 and (supplemental) device light 101. In such embodiments, the target R:FR ratio (range) may especially be selected to be >1.2, such as ≥1.3, especially ≥1.4 if the plant load is lower than a lower plant load threshold, and may especially be selected to be <1.2, such as ≤1.1, especially ≤1.0, if the plant load is higher than a higher plant load threshold.

Hence, in embodiments to obtain the target R:FR ratio the device light may have a spectral power distribution corresponding to the target R:FR ratio. In other embodiments, the target R:FR ratio may be a daily target R:FR ratio and integrating the device light over the day may provide the target R:FR ratio.

In particular, in further embodiments, the target R:FR ratio (range) may especially be selected to be above a daily threshold ratio Td if the plant load is lower than a lower plant load threshold and may especially be selected to be below a daily threshold ratio Td if the plant load is higher than a higher plant load threshold. In embodiments, the daily threshold ratio Td may be selected from the range of 0.8-2.0, such as from the range of 1.0-1.8, especially from the range of 1.1-1.6, such as from the range of 1.3-1.5. In further embodiments, the target R:FR ratio (range) may especially be selected to be >Td, especially ≥1.05*Td, such as ≥1.1*Td, especially ≥1.2*Td if the plant load is lower than a lower plant load threshold. In further embodiments, the target R:FR ratio (range) may especially be selected to be <Td, especially ≤0.95*Td, such as ≤0.9*Td, especially ≤0.8*Td if the plant load is higher than a higher plant load threshold.

In further embodiments, the device light 101 may comprise a light spectrum according to (or "in line with") the target R:FR ratio. In further embodiments, the R:FR ratio (range) may be a daily target R:FR ratio (range) for the (supplemental) device light 101, i.e., the device light may be provided such that the integral of the (supplemental) device light 101 across a day is according to the R:FR ratio.

FIG. 1 also schematically depicts an embodiment of a horticulture system 400 comprising the system 1000. The horticulture system 400 may comprise a horticulture space 410 for hosting a pepper plant 10. System 1000 may be configured to provide the device light 101 to the horticulture space 410. The horticulture space 410 may be configured to receive natural daylight 1, and the device light 101 may comprise supplemental device light. The horticulture system may comprise one or more of a greenhouse and a vertical farm.

In specific embodiments, the system 1000 may be configured to provide the supplemental device light during a low natural lighting period. For instance, during the low natural lighting period the photon flux density of natural daylight 1 may be ≤500 μmol/m$^2$/s in the 400-700 nm region.

As described above, the invention also provides a method for cultivating a pepper plant 10, with the method may comprising: (a) (a sensing stage comprising) acquiring an input signal, wherein the input signal relates to (or comprises) a plant load-related parameter of the pepper plant 10. In embodiments, the method, especially the sensing stage, may comprise determining a plant load-related parameter of the pepper plant 10 and providing a (related) input signal, (b) (a planning stage comprising) determining a target R:FR ratio (range) of red light to far red light (in μmol/m$^2$/day) based on the input signal and a plant load threshold, and (c) (an execution stage comprising) exposing the pepper plant 10 to the target R:FR ratio by providing device light 101. As described above, the invention may also provide a method for cultivating a pepper plant 10, wherein the method may comprise: (a) (a sensing stage comprising) determining a plant load-related parameter of the pepper plant 10 and to provide an input signal, (b) (a planning stage comprising) determining a target phytochrome stationary state based on the input signal and a plant load threshold, and (c) (an execution stage comprising) subjecting the pepper plant 10 to the target phytochrome stationary state by providing device light 101.

In embodiments, the herein proposed method may include the following: (a) specifying a desired abortion rate or a desired plant load. Alternatively, these desired quantities are obtained from a model; (b) regularly measuring the abortion rate or the plant load; (c) based on these desired quantities and a measurement of these quantities, adapting the R:FR ratio in the device light 101 or in the daily integral of all the light offered to the plant, by adapting the light in the R channel and/or the FR channel of the (supplemental) device light 101: (i) in case the abortion rate is above a first threshold or the plant load is below a first threshold, increase the R:FR ratio; (ii) in case the abortion rate is below a second threshold or the plant load is above a second threshold, decrease the R:FR ratio. The thresholds may depend on the daily-daylight-integral. Alternatively: (i) in case the plant load increases, decrease the R:FR ratio; (ii) in case the plant load decreases, increase the R:FR ratio.

Further, a system can be based on the proposed method, including a feedback loop. Especially, the red light may be applied mainly at times the daylight level is low (such as before or at begin-of-day, at or after end-of-day, or during cloud cover). Further, in embodiments the preferred red wavelength may be in the range of 620-670 nm, such as 660 nm, and more especially in the range of 620-640 nm, such as about 630 nm. The preferred far-red wavelength may be in the range of 720-740 nm.

In embodiments, instead of the R:FR ratio, also the so-called phytochrome-stationary-state (PSS) value can be used (a high R:FR ratio implies a high PSS and vice versa).

Further, instead of abortion rate, also a net fruit set rate can be used (net fruit set rate goes down in case abortion rate goes up and vice versa), etc. see also above. The net fruit set rate may be defined as the fruit set rate minus the fruit abortion rate.

Figure 2:
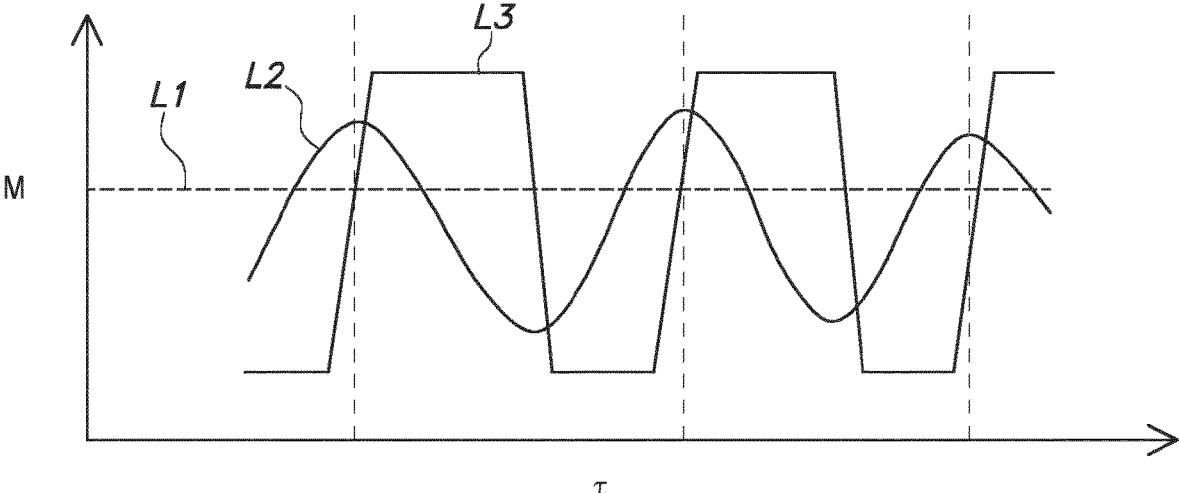
FIG. 2 schematically depicts some aspects of the invention. The schematic drawings are not necessarily to scale.

Referring to FIG. 2, curve L2 represents a plant load over time. In particular, FIG. 2 schematically depicts how a periodic pattern in the net fruit set rate (called flushing pattern) will result in a periodic pattern in the plant load as well as in the yield. However, a (more or less) constant plant load is desired, resulting in a constant yield, as represented by curve L1. This will happen in case the net fruit set rate is constant, which in turn implies the abortion rate is constant. Note that the flowering rate and fruit set rate may have a dependence on temperature. In particular, a higher temperature may result in a higher flowering rate and/or in a higher fruit set rate). Hence, in embodiments, especially in the planning stage, the control system may (be configured to) determine the target R:FR ratio (range) based at least partially on an (expected) ambient temperature of the pepper plant, such as based on the input signal, a plant load threshold, and an (expected) ambient temperature.

Thus, in practice, the plant load over time shows periodic fluctuations. Desired is a constant plant load that, preferably, exceeds the average of the actual fluctuating plant load. Hence, at regular times, the abortion rate may be measured. This can be done for example by labelling new set fruits and later on checking whether they are still present on the plant. The plant load may be measured by counting the number of fruits hanging on a plant. Measuring the plant load may be easier than measuring the abortion rate. Based on this measured abortion rate or plant load, etc., the ratio of R and FR in the (daily integral of) (supplemental) device light offered to the plants may be adapted, as represented by the curve L3. This may lead to a more flattened yield, see the more desired curve L1. On the x-axis, the time τ is indicated, and on the y-axis a magnitude M, like yield.

For example, in case the plant load is above a first threshold, the R:FR ratio may be decreased. In case the plant load is below a second threshold, the R:FR ratio may be increased (the second threshold being lower than or equal to the first threshold). This behavior is graphically depicted in FIG. 2.

It may be desirable to offer more supplemental light on cloudy days compared to sunny days, to ensure a well-balanced crop and sufficient production of assimilates for plant and fruit growth. This implies that typically, in practice, the R:FR ratio in the daily integral of all the light offered to the plants may be different for cloudy days compared to sunny days (since the spectrum of the supplemental light typically may differ from that of daylight). Hence, in embodiments the abovementioned thresholds may be dependent on the daily integral of the daylight.

In embodiments, a feedback loop that adjusts the R:FR ratio in the daily integral of light offered to the plants to reduce the fluctuations in abortion rate or plant load may be used. For instance, as a first step, the system is initialized to reflect the crop growth strategy of a grower (e.g. growing sweet pepper with a certain plant density, a desired net fruit set rate, or a desired abortion rate, or a desired plant load, a desired temperature, etc.). Next, in a repeating loop, the abortion rate may be measured. Alternatively, the plant load is measured (see also above for the options). Next a decision may be taken. Examples of such decisions are a decision A wherein the abortion rate is above a first (abortion) threshold or the plant load is below a first (load) threshold, or a decision B wherein the abortion rate is below a second (abortion) threshold or the plant load is above a second (load) threshold. Next, actions may be taken. Examples of such actions are action A wherein if decision A is true, then increase the R:FR ratio, or action B wherein if decision B is true, then decrease the R:FR ratio. The feedback loop may be based on the well-known principle of PID control or based on a machine learning model that applies reinforcement learning.

The invention may further be implemented by dividing a horticulture space in two or more parts. By controlling by light different temporal behavior, the average yield may be made even more constant. For instance, the crop cultivation area may be split in n parts. An overall (more) constant yield can in principle also be obtained as follows: split the crop cultivation area in n (equal) parts. Use the methods discussed in the previous embodiments above to gradually shift the phase of the periodic yield pattern for each part, such that the yield patterns are out of phase by 360°/n. Especially, n is 2 or more.

Typically, circumstances in a horticulture space, such as in a greenhouse, may depend on the location in the horticulture space. For example, the temperature may not be uniform across a greenhouse. As a result, the abortion rate or plant load may also not be uniform across the greenhouse. Also, as a result, fluctuations in the abortion rate and plant load may be out of phase for different locations in the greenhouse. Therefore, in addition to the reasons mentioned above, it may be beneficial to divide the greenhouse into two or more parts and control the light for each part independently.

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to the advantage. In yet a further aspect, the invention (thus) provides a software product, which, when running on a computer, is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for cultivating a pepper plant, wherein the system comprises a light generating device and a control system, wherein the light generating device is configured to provide device light to the pepper plant, wherein the device light comprises one or more of red light and far red light, wherein the red light comprises one or more wavelengths in the range of 600-700 nm, and wherein the far red light comprises one or more wavelengths in the range of 700-800 nm; wherein the system has an operational mode wherein:

the control system is configured to acquire an input signal, wherein the input signal relates to a plant load-related parameter of the pepper plant, a plant load being a number of fruits hanging on a plant, wherein the plant load-related parameter is selected from the group comprising the plant load, a flowering rate, a flower abortion rate, a fruit set rate, and a fruit abortion rate;

the control system is configured to determine a plant load based on the input signal, and wherein one or more of the following applies: (i) the control system is configured to compare the plant load to a lower plant load threshold, and to select a target R:FR ratio of red light to far red light above a threshold ratio T if the plant load is lower than the lower plant load threshold; and (ii) the control system is configured to compare the plant load to a higher plant load threshold, and to select the target R:FR ratio below the threshold ratio T if the plant load is higher than the higher plant load threshold, wherein the threshold ratio T is selected from the range of 10-25;

the control system is configured to control the light generating device to expose the pepper plant to the target R:FR ratio.

2. The system according to claim 1, wherein the system comprises a sensor system, wherein in the operational mode:

the sensor system is configured to determine the plant load-related parameter of the pepper plant and to provide a related sensor input signal to the control system;

the control system is configured to determine the plant load based on the related sensor input signal.

3. The system according to claim 1, wherein the control system comprises a user interface, and wherein in the operational mode:

the user interface is configured to receive user input on the plant load-related parameter of the pepper plant and to provide a related user input signal to the control system;

the control system is configured to determine the plant load based on the related user input signal.

4. The system according to claim 1, wherein the control system is configured to determine a time derivative of the plant load based on the input signal, and wherein one or more of the following applies: (i) the control system is configured to compare the time derivative of the plant load to a plant load time derivative threshold, and to select a target R:FR ratio above the threshold ratio T if the time derivative of the plant load is higher than the plant load time derivative threshold; and (ii) the control system is configured to compare the time derivative of the plant load to a plant load time derivative threshold, and to select a target R:FR below the threshold ratio T if the time derivative of the plant load is lower than the plant load time derivative threshold, and wherein the threshold ratio is selected from the range of 13-17.

5. The system according to claim 1, wherein the plant load is a forecasted plant load, and wherein one or more of the lower plant load threshold and the higher plant load threshold are selected in view of a target yield, wherein the target yield comprises one or more of a fruit number, a fruit mass, and a fruit ripening time.

6. The system according to claim 1, wherein the plant load is a current plant load.

7. The system according to claim 2, wherein the sensor system comprises a moveable sensor device configured to determine the plant load-related parameter.

8. The system according to claim 1, wherein the pepper plant is selected from the genus *Capsicum*.

9. The system according to claim 1, wherein the control system is configured to control the light generating device to subject the pepper plant to a light exposure of at least 5 mol/m²/d, and wherein the target R:FR ratio is a daily target R:FR ratio of the device light.

10. A horticulture system comprising the system according to claim 1, wherein the horticulture system comprises a horticulture space for hosting a pepper plant, and wherein the system is configured to provide the device light to the horticulture space.

11. The horticulture system according to claim 10, wherein the horticulture space is configured to receive natural daylight, and wherein the device light comprises supplemental device light.

12. The horticulture system according to claim 11, wherein the system is configured to provide the supplemental device light during a low natural lighting period in the second half of the day, wherein during the low natural lighting period the photon flux density of natural daylight (1) is ≤500 μmol/m²/s in the 400-700 nm region.

13. A method for cultivating a pepper plant, wherein the method comprises:

acquiring an input signal, wherein the input signal relates to a plant load-related parameter of the pepper plant, a plant load being a number of fruits hanging on a plant, wherein the plant load-related parameter is selected from the group comprising a plant load, a flowering rate, a flower abortion rate, a fruit set rate, and a fruit abortion rate;

determining a plant load based on the input signal, and one or more of: (i) comparing the plant load to a lower plant load threshold, and selecting a target R:FR ratio of red light to far red light above a threshold ratio T if the plant load is lower than the lower plant load threshold; and (ii) comparing the plant load to a higher plant load threshold, and selecting a target R:FR ratio below the threshold ratio T if the plant load is higher than the higher plant load threshold, wherein the red light comprises one or more wavelengths in the range of 600-700 nm, and wherein the far red light comprises one or more wavelengths in the range of 700-800 nm, wherein the threshold ratio is selected from the range of 10-25;

exposing the pepper plant to the target R:FR ratio by providing device light.

14. The method according to claim 13, wherein the threshold ratio is selected from the range of 10-20, and wherein the method comprises one or more of: (a) selecting a target R:FR ratio >20 if the plant load is lower than the lower plant load threshold; and (b) selecting a target R:FR ratio <10 if the plant load is higher than the higher plant load threshold.

15. The method according to claim 13, wherein the plant load is a forecasted plant load or wherein the plant load is a current plant load; wherein the method further comprises exposing the pepper plant to natural daylight, and wherein the method comprises providing the device light during a low natural lighting period, wherein during the low natural lighting period the photon flux density of natural daylight is ≤500 μmol/m²/s in the 400-700 nm region, and wherein the target R:FR ratio is a daily target R:FR ratio.

* * * * *